US012347161B2

United States Patent
Liu et al.

(10) Patent No.: US 12,347,161 B2
(45) Date of Patent: Jul. 1, 2025

(54) SYSTEM AND METHOD FOR DUAL-VALUE ATTENTION AND INSTANCE BOUNDARY AWARE REGRESSION IN COMPUTER VISION SYSTEM

(71) Applicant: Samsung Electronics Co., Ltd., Suwon-si (KR)

(72) Inventors: Qingfeng Liu, San Diego, CA (US); Mostafa El-Khamy, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 533 days.

(21) Appl. No.: 17/868,660

(22) Filed: Jul. 19, 2022

(65) Prior Publication Data

US 2023/0260247 A1    Aug. 17, 2023

Related U.S. Application Data

(60) Provisional application No. 63/311,246, filed on Feb. 17, 2022.

(51) Int. Cl.
*G06K 9/00* (2022.01)
*G06T 7/11* (2017.01)
(Continued)

(52) U.S. Cl.
CPC ............... *G06V 10/52* (2022.01); *G06T 7/11* (2017.01); *G06V 10/26* (2022.01); *G06V 10/7715* (2022.01)

(58) Field of Classification Search
CPC ............ G06N 3/0464; G06T 3/40; G06T 2207/20081; G06T 2207/20084;
(Continued)

(56) References Cited

U.S. PATENT DOCUMENTS 8,107,726 B2    1/2012  Xu et al.
9,443,314 B1    9/2016  Huang et al.
(Continued)

FOREIGN PATENT DOCUMENTS

WO    WO 2018/187622 A1    10/2018
WO    WO 2021/068182 A1    4/2021

OTHER PUBLICATIONS

Li, Yanwei, et al. "Attention-guided unified network for panoptic segmentation." Proceedings of the IEEE/CVF conference on computer vision and pattern recognition. 2019. (Year: 2019).*
(Continued)

*Primary Examiner* — Avinash Yentrapati
(74) *Attorney, Agent, or Firm* — Lewis Roca Rothgerber Christie LLP

(57) ABSTRACT

A computer vision system including: one or more processors; and memory including instructions that, when executed by the one or more processors, cause the one or more processors to: determine a semantic multi-scale context feature and an instance multi-scale context feature of an input scene; generate a joint attention map based on the semantic multi-scale context feature and the instance multi-scale context feature; refine the semantic multi-scale context feature and instance multi-scale context feature based on the joint attention map; and generate a panoptic segmentation image based on the refined semantic multi-scale context feature and the refined instance multi-scale context feature.

20 Claims, 11 Drawing Sheets semantic segmentation instance segmentation

(51) Int. Cl.
*G06V 10/26* (2022.01)
*G06V 10/52* (2022.01)
*G06V 10/77* (2022.01)

(58) Field of Classification Search
CPC ......... G06T 7/136; G06T 7/11; G06V 10/766;
G06V 10/764; G06V 10/26; G06V 10/82;
G06V 10/7715; G06V 10/454; G06V
20/70; G06V 10/52
See application file for complete search history.

(56) References Cited

U.S. PATENT DOCUMENTS

| | | | |
|---|---|---|---|
| 9,697,443 | B2 | 7/2017 | Chen et al. |
| 10,424,064 | B2 | 9/2019 | Price et al. |
| 10,803,328 | B1 | 10/2020 | Bai et al. |
| 10,997,433 | B2 | 5/2021 | Xu et al. |
| 11,200,667 | B2 | 12/2021 | Lay et al. |
| 2018/0108138 | A1 | 4/2018 | Kluckner et al. |
| 2018/0174311 | A1 | 6/2018 | Kluckner et al. |
| 2019/0286153 | A1 | 9/2019 | Rankawat et al. |
| 2020/0278408 | A1 | 9/2020 | Sung et al. |
| 2020/0302224 | A1 | 9/2020 | Jaganathan et al. |
| 2020/0349711 | A1 | 11/2020 | Duke et al. |
| 2021/0027098 | A1 | 1/2021 | Ge et al. |
| 2021/0150722 | A1 | 5/2021 | Homayounfar et al. |
| 2021/0279950 | A1 | 9/2021 | Phalak |
| 2021/0326656 | A1* | 10/2021 | Lee ........................ G06F 18/217 |
| 2021/0374968 | A1 | 12/2021 | Martinez et al. |
| 2023/0104262 | A1* | 4/2023 | Lin ........................... G06T 7/11 |
| | | | 382/173 |
| 2024/0212164 | A1* | 6/2024 | Li ............................. G06T 7/11 |

OTHER PUBLICATIONS

Cheng, Bowen, et al., "Panoptic-DeepLab: A Simple, Strong, and Fast Baseline for Bottom-Up Panoptic Segmentation," 2020 IEEE/CVF Conference on Computer Vision and Pattern Recognition (CVPR), 2020, 16 pages.

Gao, Naiyu, et al., "Learning Category- and Instance-Aware Pixel Embedding for Fast Panoptic Segmentation," IEEE Transactions on Image Processing, vol. 30, 2021, pp. 6013-6023.

Liu, Xiaolong, et al., "CASNet: Common Attribute Support Network for image instance and panoptic segmentation," 2020 25th International Conference on Pattern Recognition (ICPR), 2020, pp. 8469-8475.

Wang, Haochen, et al. "Pixel Consensus Voting for Panoptic Segmentation," 2020 IEEE/CVF Conference on Computer Vision and Pattern Recognition (CVPR), 2020, pp. 9464-9473.

Zhang, Weitong, et al., "End-To-End Panoptic Segmentation With Pixel-Level Non-Overlapping Embedding," 2019 IEEE International Conference on Multimedia and Expo (ICME), 2019, pp. 976-981.

* cited by examiner

SYSTEM AND METHOD FOR DUAL-VALUE ATTENTION AND INSTANCE BOUNDARY AWARE REGRESSION IN COMPUTER VISION SYSTEM

CROSS-REFERENCE TO RELATED APPLICATION(S)

The present application claims priority to and the benefit of U.S. Provisional Application No. 63/311,246, filed on Feb. 17, 2022, entitled "DUAL-VALUE ATTENTION AND INSTANCE BOUNDARY AWARE REGRESSION FOR PANOPTIC SEGMENTATION," the entire content of which is incorporated by reference herein.

FIELD

Aspects of one or more embodiments of the present disclosure relate to a computer vision system, and more particularly, to panoptic segmentation for a computer vision system.

BACKGROUND

Generally, panoptic segmentation is a joint machine learning task of assigning labels to "stuff" (e.g., amorphous and uncountable objects, such as road, sky, grass, and the like) and "things" (e.g., countable and distinct objects, such as cars, people, animals, and the like) contained in an image. It combines the typically distinct machine learning tasks of semantic segmentation and instance segmentation, such that all pixels in the image are assigned a class label, and all object instances in the image are uniquely segmented and assigned an instance label. Accordingly, panoptic segmentation may provide more rich, holistic information about a given scene than each of semantic segmentation and instance segmentation alone.

The above information disclosed in this Background section is for enhancement of understanding of the background of the present disclosure, and therefore, it may contain information that does not constitute prior art.

SUMMARY

One or more embodiments of the present disclosure are directed to improved systems and methods for panoptic segmentation in a computer vision system.

One or more embodiments of the present disclosure are directed to a dual value attention model to encode interactions between both the semantic segmentation branch and the instance segmentation branch in an attention map such that information learned from one branch may be utilized to improve the performance of the other branch.

One or more embodiments of the present disclosure are directed to boundary aware regression loss for training center offset regression in the instance segmentation prediction head by assigning more weights to boundary pixels to improve performance for instance center offset predictions.

According to one or more embodiments of the present disclosure, a computer vision system includes: one or more processors; and memory including instructions that, when executed by the one or more processors, cause the one or more processors to: determine a semantic multi-scale context feature and an instance multi-scale context feature of an input scene; generate a joint attention map based on the semantic multi-scale context feature and the instance multi-scale context feature; refine the semantic multi-scale context feature and instance multi-scale context feature based on the joint attention map; and generate a panoptic segmentation image based on the refined semantic multi-scale context feature and the refined instance multi-scale context feature.

In an embodiment, to generate the joint attention map, the instructions may further cause the one or more processors to calculate normalized correlations between the semantic multi-scale context feature and the instance multi-scale context feature.

In an embodiment, to calculate the normalized correlations, the instructions may further cause the one or more processors to: convolve and reshape the semantic multi-scale context feature; convolve, reshape, and transpose the instance multi-scale context feature; apply a matrix multiplication operation between the reshaped semantic multi-scale context feature and the transposed instance multi-scale context feature; and apply a softmax function to the output of the matrix multiplication operation.+

In an embodiment, to refine the semantic multi-scale context feature, the instructions may further cause the one or more processors to: convolve and reshape the semantic multi-scale context feature; apply a matrix multiplication operation between the reshaped semantic multi-scale context feature and the joint attention map; and reshape the output of the matrix multiplication operation.

In an embodiment, to refine the instance multi-scale context feature, the instructions may further cause the one or more processors to: convolve and reshape the instance multi-scale context feature; apply a matrix multiplication operation between the reshaped instance multi-scale context feature and the joint attention map; and reshape the output of the matrix multiplication operation.

In an embodiment, to generate the panoptic segmentation image, the instructions may further cause the one or more processors to: generate a semantic segmentation prediction based on the refined semantic multi-scale context feature; generate an instance segmentation prediction based on the refined instance multi-scale context feature; and fuse the semantic segmentation prediction with the instance segmentation prediction.

In an embodiment, the instance segmentation prediction may include: an instance center prediction; and an instance center offset prediction.

In an embodiment, the instance center offset prediction may be trained accordingly to an instance boundary aware regression loss function that applies more weights and penalties to boundary pixels defined in a ground truth boundary map than those applied to other pixels.

In an embodiment, the ground truth boundary map may be generated by comparing a Euclidean distance between a pixel and a boundary with a threshold distance.

According to one or more embodiments of the present disclosure, a panoptic segmentation method includes: determining a semantic multi-scale context feature and an instance multi-scale context feature of an input scene; generating a joint attention map based on the semantic multi-scale context feature and the instance multi-scale context feature; refining the semantic multi-scale context feature and instance multi-scale context feature based on the joint attention map; and generating a panoptic segmentation image based on the refined semantic multi-scale context feature and the refined instance multi-scale context feature.

In an embodiment, the generating of the joint attention map may include calculating normalized correlations between the semantic multi-scale context feature and the instance multi-scale context feature.

In an embodiment, the calculating of the normalized correlations may include: convolving and reshaping the semantic multi-scale context feature; convolving, reshaping, and transposing the instance multi-scale context feature; applying a matrix multiplication operation between the reshaped semantic multi-scale context feature and the transposed instance multi-scale context feature; and applying a softmax function to the output of the matrix multiplication operation.

In an embodiment, the refining of the semantic multi-scale context feature may include: convolving and reshaping the semantic multi-scale context feature; applying a matrix multiplication operation between the reshaped semantic multi-scale context feature and the joint attention map; and reshaping the output of the matrix multiplication operation.

In an embodiment, the refining of the instance multi-scale context feature may include: convolving and reshaping the instance multi-scale context feature; applying a matrix multiplication operation between the reshaped instance multi-scale context feature and the joint attention map; and reshaping the output of the matrix multiplication operation.

In an embodiment, the generating of the panoptic segmentation image may include: generating a semantic segmentation prediction based on the refined semantic multi-scale context feature; generating an instance segmentation prediction based on the refined instance multi-scale context feature; and fusing the semantic segmentation prediction with the instance segmentation prediction.

In an embodiment, the instance segmentation prediction may include: an instance center prediction; and an instance center offset prediction.

In an embodiment, the instance center offset prediction may be trained accordingly to an instance boundary aware regression loss function that applies more weights and penalties to boundary pixels defined in a ground truth boundary map than those applied to other pixels.

In an embodiment, the ground truth boundary map may be generated by comparing a Euclidean distance between a pixel and a boundary with a threshold distance.

According to one or more embodiments of the present disclosure, a panoptic segmentation system includes: one or more processors; and memory including instructions that, when executed by the one or more processors, cause the one or more processors to: extract a semantic multi-scale context feature of an input scene; extract an instance multi-scale context feature of the input scene; generate a joint attention map based on the semantic multi-scale context feature and the instance multi-scale context feature; refine the semantic multi-scale context feature based on the joint attention map; refine the instance multi-scale context feature based on the joint attention map; predict a semantic class label based on the refined semantic multi-scale context feature; predict an instance center and an instance center offset based on the refined instance multi-scale context feature; and generate a panoptic segmentation image based on the semantic class label, the instance center, and the instance center offset.

In an embodiment, the predicting of the instance center and the instance center offset may be based on an instance boundary aware regression loss function that applies more weights and penalties to boundary pixels defined in a ground truth boundary map than those applied to other pixels, and the ground truth boundary map may be generated by comparing a Euclidean distance between a pixel and a boundary with a threshold distance.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
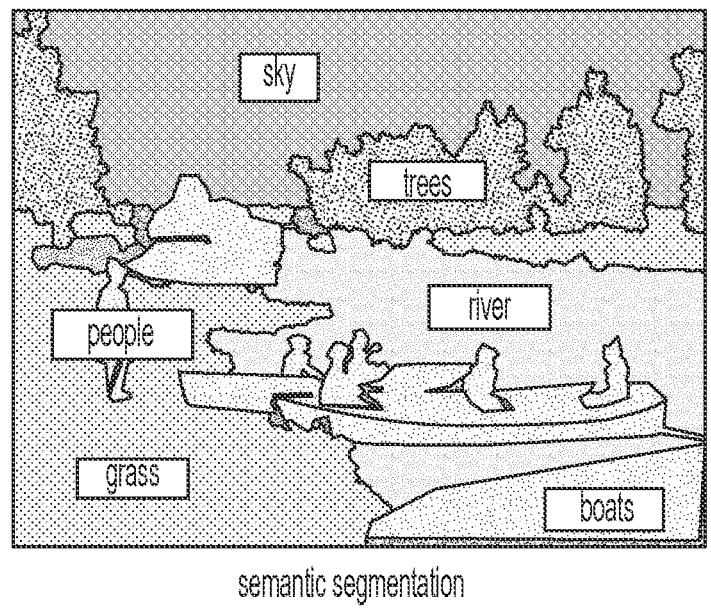
FIGS. 1A-1C illustrate examples of semantic segmentation, instance segmentation, and panoptic segmentation.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Panoptic segmentation combines semantic segmentation and instance segmentation to provide more rich, holistic information about a given scene. For example, sematic segmentation assigns a class label (e.g., car, person, grass, sky, and/or the like) to each pixel in a scene of an image, but without regards to different instances of the same type of object in the scene. On the other hand, instance segmentation assigns an instance label to each distinct object of interest in a scene by detecting and masking each of the distinct objects of interest in the scene, but without regards to amorphous objects in the scene. Thus, panoptic segmentation may provide class information for every pixel in the scene using semantic segmentation, as well detect and count the number of objects for every "thing" (e.g., instance class) in the scene using instance segmentation.

Generally, two major types of approaches to panoptic segmentation have been developed, the so-called top-down approach and bottom-up approach. The more popular of the two is the top-down approach or proposal-based perspective, which are often referred to as two-stage methods because they require an additional stage to generate proposals. Typically, in the top-down approach, a regional proposal network (RPN) is used to perform instance segmentation first, and then semantic segmentation is performed from the results of the instance segmentation branch. For example, bounding boxes around regions with distinct objects (e.g., the instance masks in the instance segmentation branch) are first generated, and then semantic segmentation is performed on the remaining regions to classify the "stuff" in the remaining regions. One issue of the top-down approach, however, may be dealing with overlapping segments when fusing the results from the semantic segmentation branch and the instance segmentation branch. Another issue with the top-down approach may be the high computation costs introduced by the proposal generation head.

On the other hand, the representative bottom-up approach extends a semantic segmentation model to perform panoptic segmentation. It adds a small number of additional parameters and marginal computation overhead onto the original network, which may be favorable to mobile devices. Typically, bottom-up approaches generate the semantic segmentation proposal first, and then detect instances by grouping "thing" pixels in the resulting semantic segmentation proposal. While such bottom-up approaches may avoid the issue of overlapping segments of the top-down approach, for some data sets, the resulting performance may be less accurate when attempting to categorize the "stuff" and/or "things." Accordingly, it may be desirable to improve the performance of such bottom-up approaches.

One or more embodiments of the present disclosure may be directed to panoptic segmentation systems and methods utilizing dual value attention (DVA) models to encode information learned between both the semantic segmentation branch and the instance segmentation branch in a joint attention map by cross-correlations. The joint attention map may be used to utilize information learned by one branch to improve the performance of the other. For example, the joint attention map may be calculated by calculating the normalized correlations between the feature maps generated by the two branches. Thus, rather than learning the information by the two branches separately, the joint attention map may be used to update (e.g., to refine) the values for the features of both the semantic segmentation branch and the instance segmentation branch to be used for the semantic segmentation prediction and the instance segmentation prediction to improve accuracy and performance.

One or more embodiments of the present disclosure may be directed to training instance center offset predictions by instance boundary aware regression loss to emphasize the importance of boundary pixels in the center offset predictions of the instance segmentation prediction head. For example, rather than ignoring the importance of boundary information as in some bottom-up approaches, during training of the instance center prediction head using the instance boundary aware regression loss, more weights may be assigned to the boundary pixels to penalize more on wrong predictions for pixels along the boundaries. Accordingly, performance of the instance segmentation prediction head is improved.

The above and other aspects and features of the present disclosure will now be described in more detail hereinafter with reference to the figures.

Figure 1B:
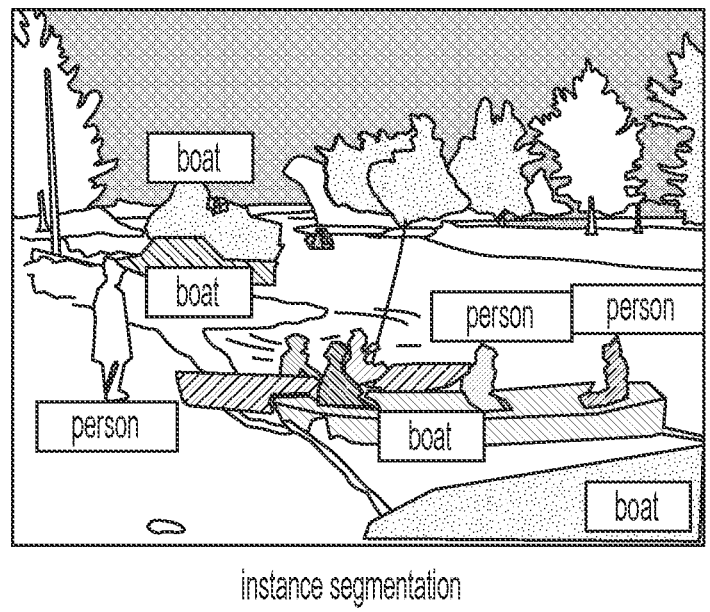
Figure 1C:
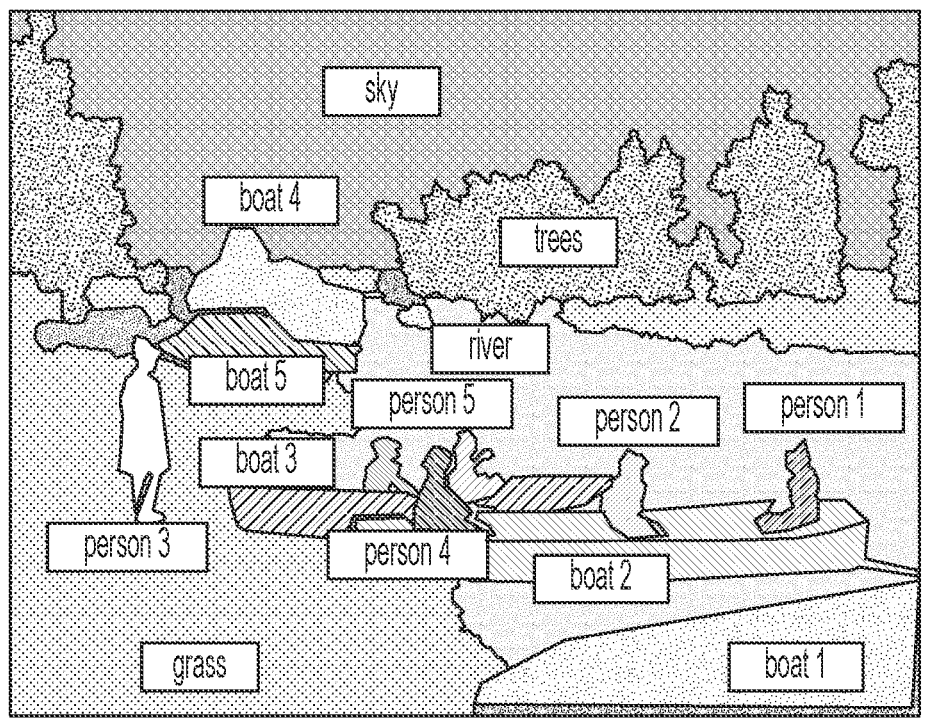

FIGS. 1A-1C illustrate examples of semantic segmentation, instance segmentation, and panoptic segmentation.

First, referring to FIG. 1A, an example output of sematic segmentation is shown, which generally refers to a machine learning task of classifying pixels in an image. Typically, each pixel in the image is assigned to one of various predefined classes, for example, such as boat, river, people, sky, trees, background, and the like, such that all objects in the image are essentially treated as "stuff" (e.g., amorphous, non-countable regions). For example, as shown in FIG. 1A, every pixel in the image is identified (e.g., colored) according to its corresponding class label, regardless of different instances of the same type of object (e.g., people, boats, and the like) in the image.

Next, referring to FIG. 1B, an example output of instance segmentation is shown, which refers to a machine learning task of detecting and masking distinct objects in an image by assigning an instance label (or an instance ID) to each distinct object (e.g., boat, person, and the like). Typically, it uses bounding boxes and pixel-wise segmentation to identify bounded regions of interest in the image containing countable "things," and ignores "stuff" classes since they typically cannot be counted one-by-one (e.g., there is only one sky). For example, as shown in FIG. 1B, every countable "thing" is identified and masked (e.g., colored) according to its instance, but the "stuff" in the image are ignored. Thus, while instance segmentation may be useful for detecting and masking each distinct object, it may not provide information about other "stuff" (e.g., non-instance classes) contained in a scene, such as the sky, trees, river, and the like.

Referring to FIG. 1C, an example output of panoptic segmentation is shown, which combines the outputs (e.g., predictions) of semantic segmentation and instance segmentation in order to provide rich information about all of the "stuff" and "things" in a given scene. For example, as shown in FIG. 1C, every pixel in an image is provided a class label using semantic segmentation, and further, every countable "thing" is detected and uniquely segmented using instance segmentation. Thus, while the pixels contained by regions corresponding to the "stuff" in the scene are provided with their corresponding class labels, the number of "things" in the scene may also be identified and uniquely masked according to their corresponding instance labels. Accordingly, more rich, holistic information about a given scene may be provided using panoptic segmentation than either of the latter two alone.

Figure 2:
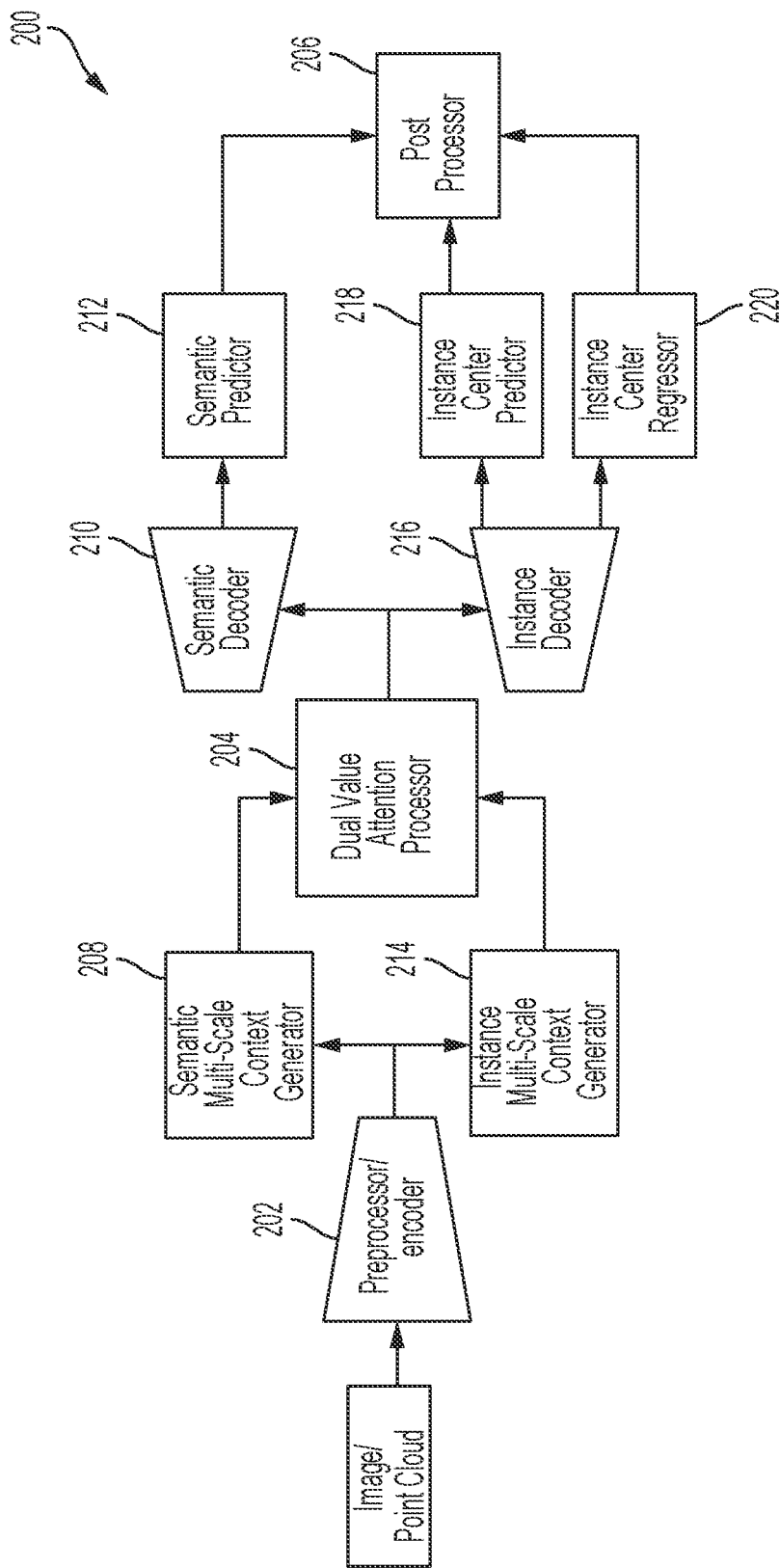
FIG. 2 illustrates a schematic block diagram of a panoptic segmentation system according to one or more embodiments of the present disclosure.

FIG. 2 illustrates a schematic block diagram of a panoptic segmentation system according to one or more embodiments of the present disclosure.

Referring to FIG. 2, a panoptic segmentation system according to one or more embodiments may include a preprocessor/encoder 202 (also referred to as a network backbone), a semantic segmentation branch, an instance segmentation branch, a dual value attention processor 204, and a post processor 206. The semantic segmentation branch may include a semantic multi-scale context generator 208, a sematic decoder 210, and a semantic predictor 212 (also referred to as a semantic prediction head). The instance segmentation branch may include an instance multi-scale context generator 214, an instance decoder 216, and an instance prediction head including an instance center predictor 218 and an instance center regressor 220.

In brief overview, as will be described in more detail below with reference to FIGS. 3A to 3D, the preprocessor/encoder 202 may extract various line features and initial features (e.g., edges, horizontal lines, vertical lines, curved lines, shapes, and the like) from a two-dimensional (2D) image or three-dimensional (3D) point cloud (which may be collectively referred to hereinafter as an input image or an input scene) to generate an initial feature map, and may provide the initial feature map to each of the semantic segmentation branch and the instance segmentation branch. The semantic multi-scale context generator 208 may extract semantic context information from the initial feature map at multiple scales to generate a semantic feature map, and the instance multi-scale context generator 214 may extract instance context information from the initial feature map at multiple scales to generate an instance feature map. The dual value attention processor 204 may generate a joint attention map based on both the semantic context information and the instance context information by calculating the normalized correlations between the feature maps of the semantic segmentation branch and the instance segmentation branch, and may use the joint attention map to update (e.g., to refine) values of the features in each of the semantic feature map and the instance feature map, respectively.

The updated semantic and instance feature maps may be decoded by the semantic decoder 210 and the instance decoder 216, respectively. The decoded sematic feature map may be used by the semantic prediction head including the semantic predictor 212 to output a semantic segmentation prediction (e.g., the class labels or a semantic segmentation image). The decoded instance feature map may be used by the instance prediction head including the instance center predictor 218 and the instance center regressor 220 to output an instance center prediction, and a center offset prediction, respectively. The post processor 206 may group the instance center prediction and the center offset prediction to generate instance masks (e.g., instance labels or an instance segmentation image) by assigning pixels to their closest predicted object center, and may fuse the semantic segmentation prediction with the instance masks to output the final panoptic segmentation image.

In some embodiments, as described in more detail below with reference to FIGS. 5 and 6, during training of the instance center regressor 220, mistaken predictions of the center offsets for boundary pixels may be penalized more to improve the instance prediction by the instance predictor head. For example, as the pixels along the boundaries between two "thing" objects may be at risk of belonging to the wrong center if there is some wrong prediction of the center offset, rather than ignoring the boundary information, more weights may be applied to the boundary pixels when training the center offset regression using instance boundary aware regression loss.

FIGS. 3A-3D illustrate parts of the panoptic segmentation system shown in FIG. 2 in more detail according to one or more embodiments of the present disclosure.

Figure 3A:
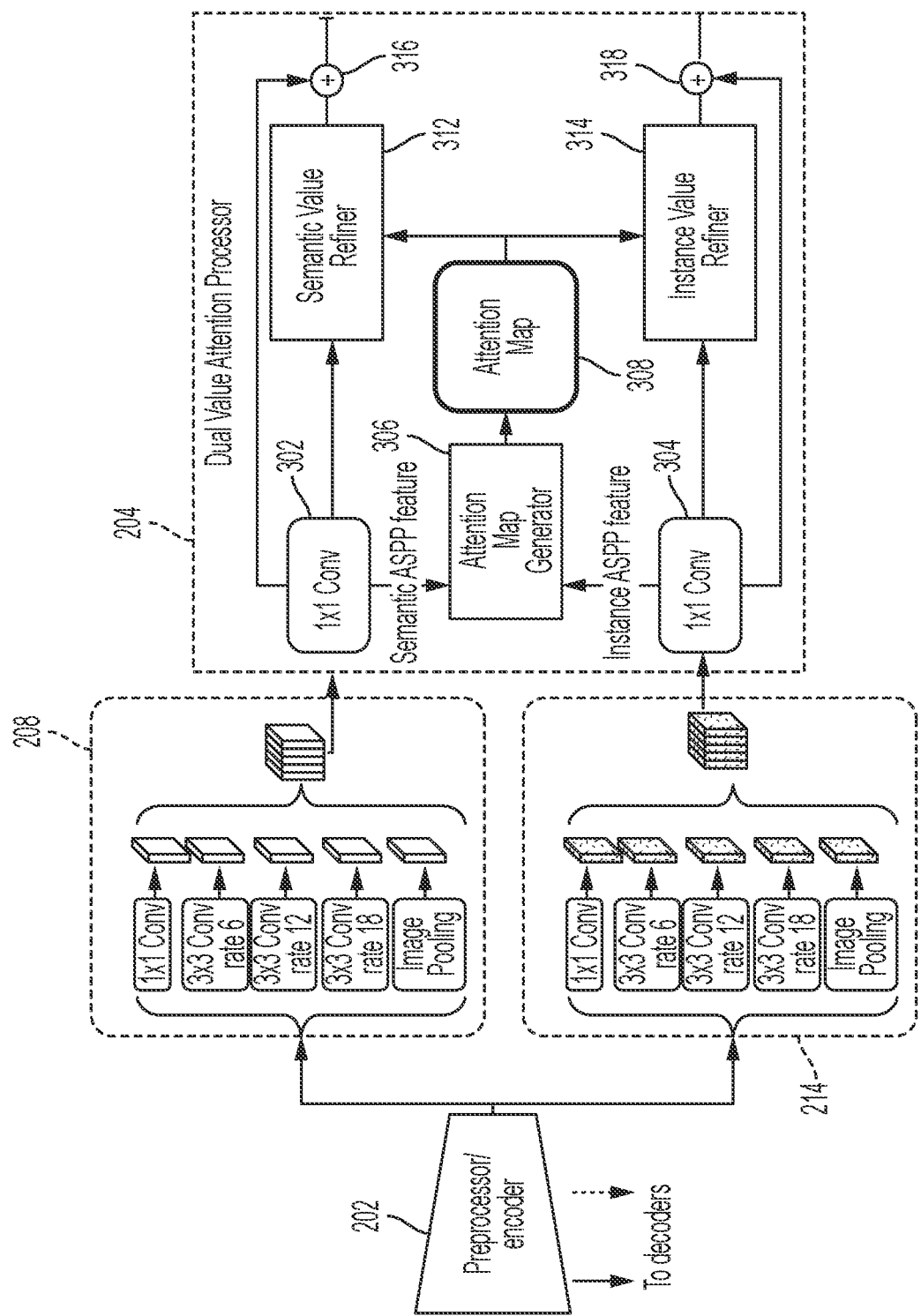
FIGS. 3A-3D illustrate parts of the panoptic segmentation system shown in FIG. 2 in more detail according to one or more embodiments of the present disclosure.

First, referring to FIG. 2 and FIG. 3A, the preprocessor/encoder 202 may receive an image (e.g., from a camera or sensor) or a 3D point cloud (e.g., from a Lidar), and may extract various line features and initial features (e.g., edges, vertical lines, horizontal lines, curves, bends, shapes, and the like) from the image/3D point cloud (which may be collectively referred to as an input image or an input scene) by convolution to generate an initial feature map. For example, in some embodiments, the preprocessor/encoder 202 may include a plurality of filters (e.g., convolution layers) to extract various line features from an input image or scene (e.g., a 2D image or 3D point cloud). For example, in some embodiments, the preprocessor/encoder 202 may include a neural network (e.g., a pretrained convolutional neural network (CNN)) coupled with atrous convolution in the last block of the neural network to extract a denser feature map from the image/point cloud. The preprocessor/encoder 202 may provide the initial feature map to each of the semantic multi-scale context generator 208 and the instance multi-scale context generator 214. Further, because the convolution may reduce the size (e.g., the spatial resolution) of the original image/point cloud in the initial feature map, the preprocessor/encoder 202 may provide spatial information of the original image/point cloud to the decoders 210 and 216 to recover the spatial resolution when subsequently upscaling.

The semantic multi-scale context generator 208 may extract semantic context information for each of the pixels from the initial feature map at multiple scales, for example, using a kind of dilated convolution such as atrous spatial pyramid pooling (ASPP), and may determine a semantic value (e.g., a semantic ASPP feature) of each of the pixels to generate a semantic feature map. For example, as shown in FIG. 3A, the semantic multi-scale context generator 208 may include a plurality of convolution layers with different rates (e.g., 1×1 Conv, 3×3 Conv rate 6, 3×3 Conv rate 12, 3×3 Conv rate 18, and/or the like) to extract the multi-scale semantic context information of each pixel, and an image pooling layer to combine (e.g., to pool) the multi-scale convolutions to generate the semantic feature map including the semantic value for each pixel. Thus, the semantic feature map may include the multiscale context information for each pixel, where the context size may be from a 6×6 window to a global feature map. The semantic multi-scale context generator 208 may provide the semantic feature map to the dual value attention processor 204 for further refinement.

The instance multi-scale context generator 214 may extract instance context information for each of the pixels from the initial feature map at multiple scales, for example, using a kind of dilated convolution such as ASPP, and may determine an instance value (e.g., an instance ASPP feature) of each of the pixels, such as a weighted sum value, to generate an instance feature map. For example, as shown in FIG. 3A, the instance multi-scale context generator 214 may include a plurality of convolution layers with different rates (e.g., 1×1 Conv, 3×3 Conv rate 6, 3×3 Conv rate 12, 3×3 Conv rate 18, and/or the like) to extract the multi-scale instance context information of each pixel, and an image pooling layer to combine (e.g., to pool) the multi-scale convolutions to generate the instance feature map including the instance value of each pixel. Thus, the instance feature map may include the multiscale context information for each pixel, where the context size may be from a 6×6 window to a global feature map. The instance multi-scale context generator 208 may provide the instance feature map to the dual value attention processor 204 for further refinement.

The dual value attention processor 204 may generate a joint attention map 308 based on the sematic context information and the instance context information, and may refine the semantic values and instance values based on the joint attention map 308. For example, in some embodiments, the dual value attention processor 204 may generate the attention map 308 from the context information received from the two branches to encode joint information (e.g., relationships between keys, queries, and values) by cross-correlations as dual values in the attention map 308. In some embodiments, complexity may be reduced by calculating a single joint attention map 308 that encodes the joint information between the two branches, and then the joint attention map 308 may be used to transfer information between the two branches, such that the context (e.g., the features) learned by one branch may be used to improve the other.

For example, the context information between the semantic segmentation branch and the instance segmentation branch may help each other. To model this interaction, spatial attention may be used, but rather than the self-attention schema, the attention map 308 may be generated by calculating the normalized correlations between the feature maps from the semantic segmentation branch and the instance segmentation branch. Afterwards, the attention map 308 may be used to update (e.g., to refine) the values for the feature maps of both the semantic segmentation branch and the instance segmentation branch, and these refined values are fed into their respective decoders 210 and 216. For example, the feature at each pixel of the refined feature map may be a linear combination of all the other features at other pixels of the input feature map (e.g., the semantic feature map or the instance feature map).

In more detail, as shown in FIG. 3A, the dual value attention processor 204 may include a convolution layer (e.g., 1×1 Conv) 302 and 304 at outputs of each of the semantic multi-scale context generator 208 and the instance multi-scale context generator 214 to extract the semantic value (e.g., the semantic ASPP feature) and the instance value (e.g., the instance ASPP feature) for each pixel in the semantic feature map and the instance feature map, respectively. The semantic value and the instance value may be input to an attention map generator 306 to generate the joint attention map 308, and the join attention map 308 may be input to each of a sematic value refiner 312 and an instance value refiner 314 to update (e.g., to refine) the semantic value and the instance value, respectively, based on the values (e.g., the dual values) in the attention map 308.

Figure 3B:
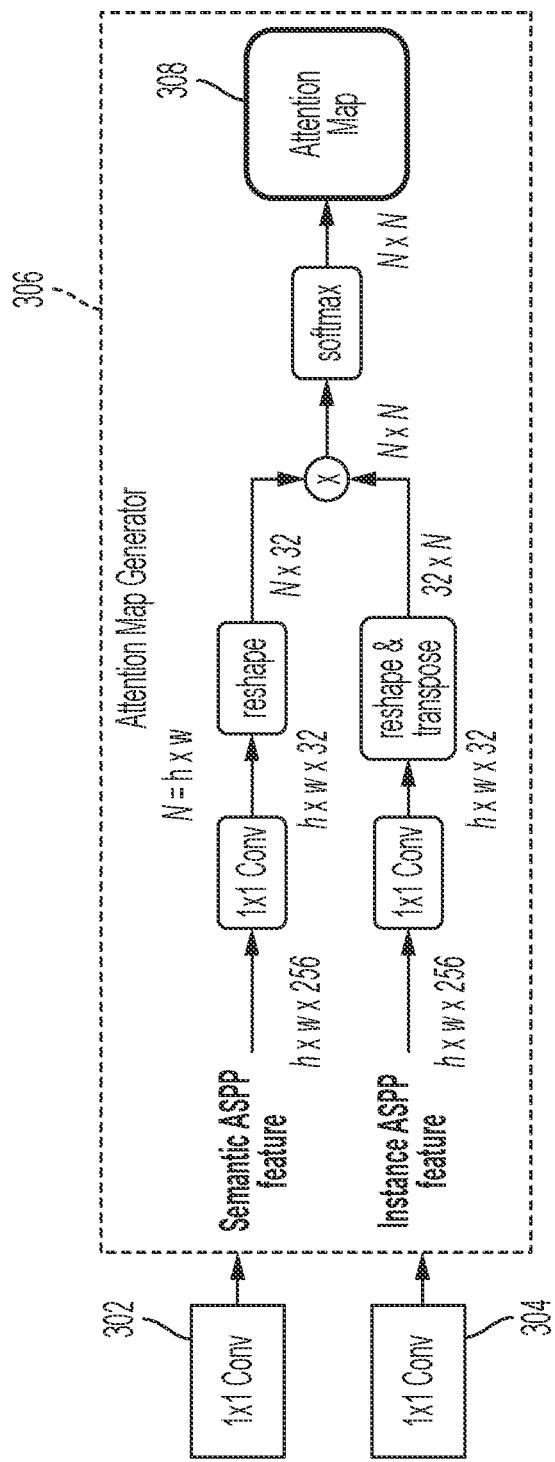

For example, referring to FIG. 3B, the attention map generator 306 may receive the semantic ASPP feature and the instance ASPP feature, may convolve (e.g., 1×1 Conv) and reshape the semantic ASPP feature, and may convolve (e.g., 1×1 Conv), reshape, and transpose the instance ASPP feature for dimension matching. The attention map generator 306 may apply a matrix multiplication (denoted by the operator x in FIG. 3B) between the reshaped semantic ASPP feature and the reshaped and transposed instance ASPP feature, and may apply a softmax function to generate the attention map 308.

In more detail, ignoring the batch size, assume that the semantic ASPP feature from the semantic segmentation branch is $f_s \in R^{h \times w \times c}$, the instance ASPP feature from the instance segmentation branch is $f_i \in R^{h \times w \times c}$, and $N = h \times w$, then the joint (e.g., cross-branch) attention map A is defined by Equation 1.

$$A = \text{softmax}(T_s(f_s) \times T_i(f_i))$$  Equation 1:

In Equation 1, $T_s(\cdot)$ and $T_i(\cdot)$ are operations applied to the semantic ASPP feature $f_s$ and the instance ASPP feature $f_i$, respectively, in order to reduce time complexity and match the dimensions for the matrix multiplication that is denoted by the operator x. The generated attention map A may then be used by each of the semantic value refiner 312 and the instance value refiner 314 to apply dual-value refinement to refine the semantic ASPP feature $f_s$ and the instance ASPP feature $f_i$, respectively, as shown in FIG. 3C.

Figure 3C:
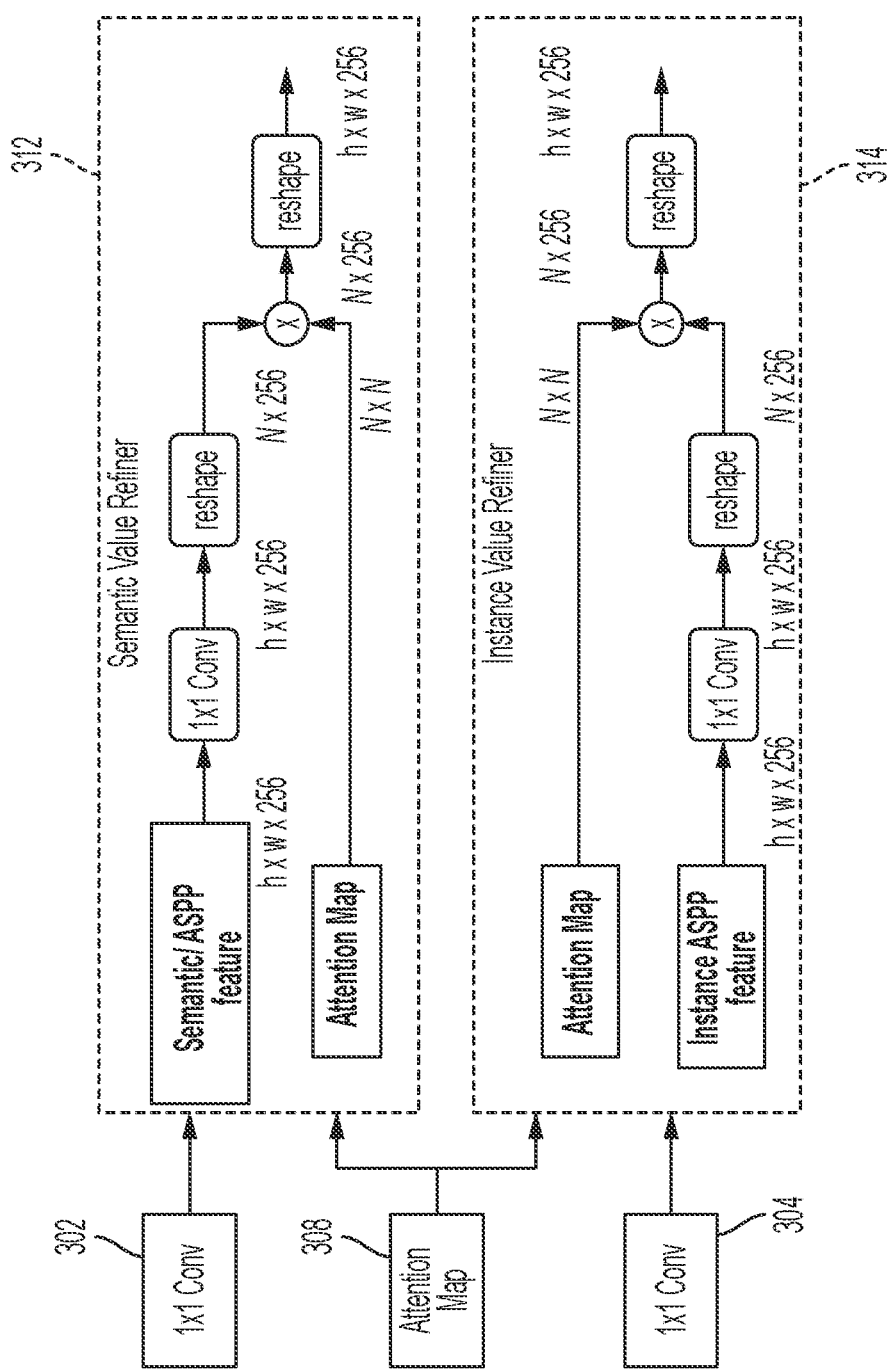

For example, referring to FIG. 3A and FIG. 3C, the semantic value refiner 312 may receive the semantic ASPP feature (e.g., from the 1×1 Conv 302) and the generated attention map 308. The semantic value refiner 312 may convolve (e.g., 1×1 Conv) and reshape the semantic ASPP feature, and may perform a matrix multiplication (e.g., denoted by the operator x in the figure) between the reshaped semantic ASPP feature and the corresponding values in the attention map 308. The semantic value refiner 312 may reshape the output of the matrix multiplication, and the output of the semantic value refiner 312 may be added 316 (e.g., see FIG. 3A) to the semantic ASPP feature (e.g., from the 1×1 Conv 302) to be fed into the semantic decoder 210 for upscaling.

In more detail, the semantic value refiner 312 may refine the semantic ASPP feature $f_s$ based on the generated attention map A according to Equation 2.

$$f_s = f_s + \alpha_s R(A \times V_s(f_s))$$  Equation 2:

In Equation 2, the $V_s(\cdot)$ is an operation applied to the semantic ASPP feature $f_s$, as is a learnable scalar variable, and $R(\cdot)$ is the reshape operation to match the dimension for skip connection.

Similarly, for example, the instance value refiner 314 may receive the instance ASPP feature (e.g., from the 1×1 Conv 304) and the generated attention map 308. The instance value refiner 314 may convolve (e.g., 1×1 Conv) and reshape the instance ASPP feature, and may perform a matrix multiplication (e.g., denoted by the operation x in the figure) between the reshaped instance ASPP feature and the corresponding values in the attention map 308. The instance value refiner 314 may reshape the output of the matrix multiplication, and the output of the instance value refiner 314 may be added 318 (e.g., see FIG. 3A) to the instance ASPP feature (e.g., from the 1×1 Conv 304) to be fed into the instance decoder 216 for upscaling.

In more detail, the instance value refiner 314 may refine the instance ASPP feature $f_i$ based on the generated attention map A according to Equation 3.

$$f_i = f_i + \alpha_i R(A \times V_i(f_i))$$  Equation 3:

In Equation 3, the $V_i(\cdot)$ is an operation applied to the instance ASPP feature $f_i$, $\alpha_i$ is a learnable scalar variable, and $R(\cdot)$ is the reshape operation to match the dimension for skip connection.

Figure 3D:
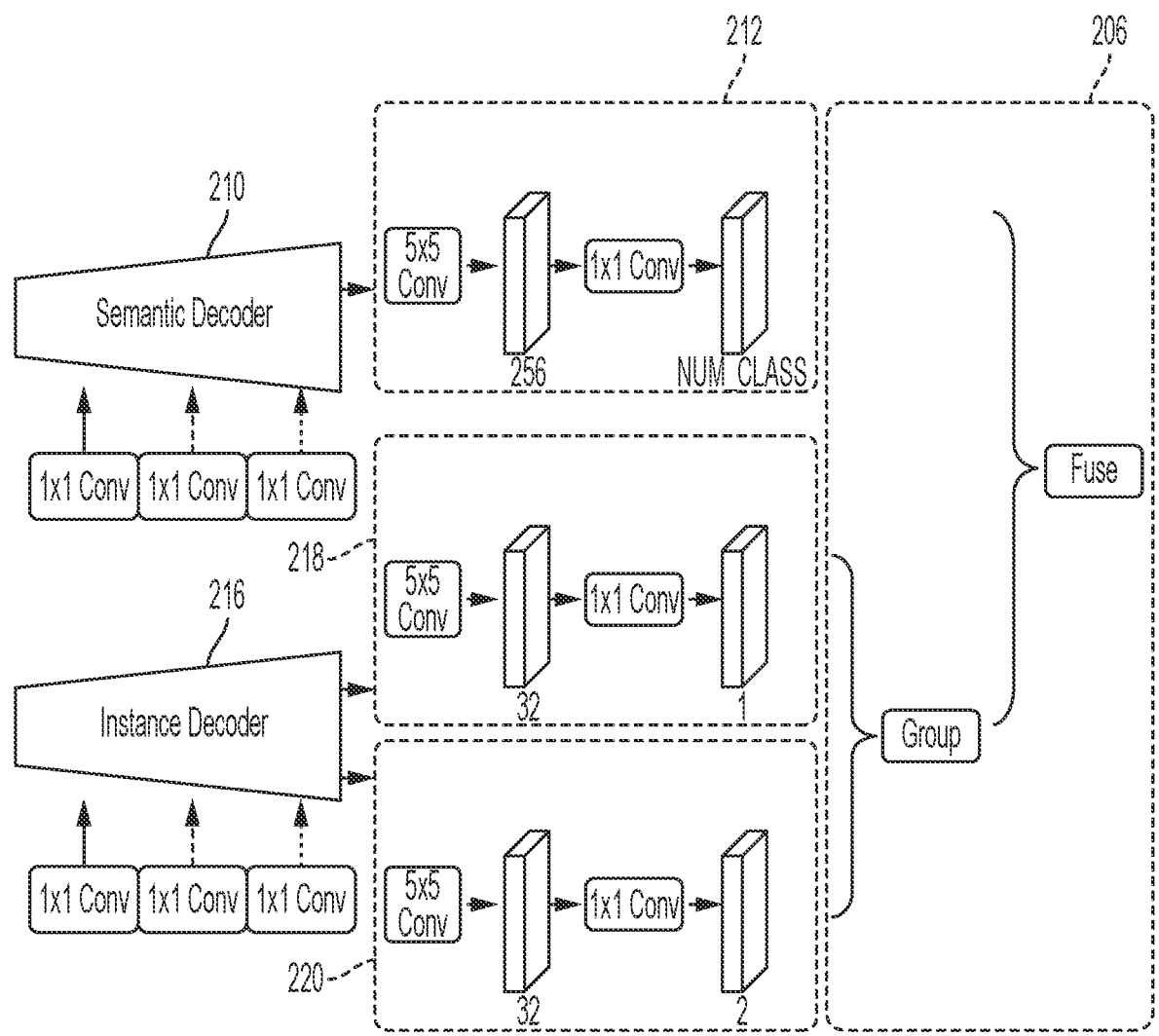

Referring to FIG. 2, FIG. 3A, and FIG. 3D, the semantic decoder 210 and the instance decoder 216 may decode the refined semantic and instance feature maps, respectively, to recover the spatial resolutions thereof based on the original spatial information of the input image/point cloud from the pre-processor/encoder 202 (e.g., see FIG. 3A). The decoded features maps may then be used to generate the sematic prediction and the instance prediction by the semantic prediction head and the instance prediction head, respectively. For example, the semantic decoder 210 and the instance decoder 216 may each include a single convolution during each upsampling stage, and may output their respective upsampled feature maps with the original spatial resolutions recovered therein, which may be used for the sematic prediction and the instance prediction, respectively.

The semantic predictor head including the sematic predictor 212 may output the semantic segmentation prediction (e.g., the class labels or the semantic segmentation image) based on the decoded semantic feature map. The instance predictor head including the instance center predictor 218 and the instance center regressor 220 may output the predicted center of each object of interest and the center offset for every relevant pixel (e.g., "thing" pixels) in the decoded instance feature map, respectively. As discussed in more detail below with reference to FIGS. 5 and 6, in some embodiments, the instance center regressor 220 may be trained to recognize the importance of the boundary pixels in the decoded instance feature map, such that the center offset predictions output by the instance center regressor 220 during inference may be improved.

The post processor 206 may group the center prediction and the center offset prediction of the instance center predictor 218 and the instance center regressor 220, respectively, to generate instance masks (e.g., instance labels or instance IDs) by assigning the relevant pixels to their closest predicted object center. The post processor 206 may fuse the instance masks with the semantic segmentation prediction output by the sematic predictor 212 to generate the final panoptic segmentation image, such that each of the pixels are assigned a corresponding class label and corresponding instance label (e.g., the instance IDs).

Figure 4:
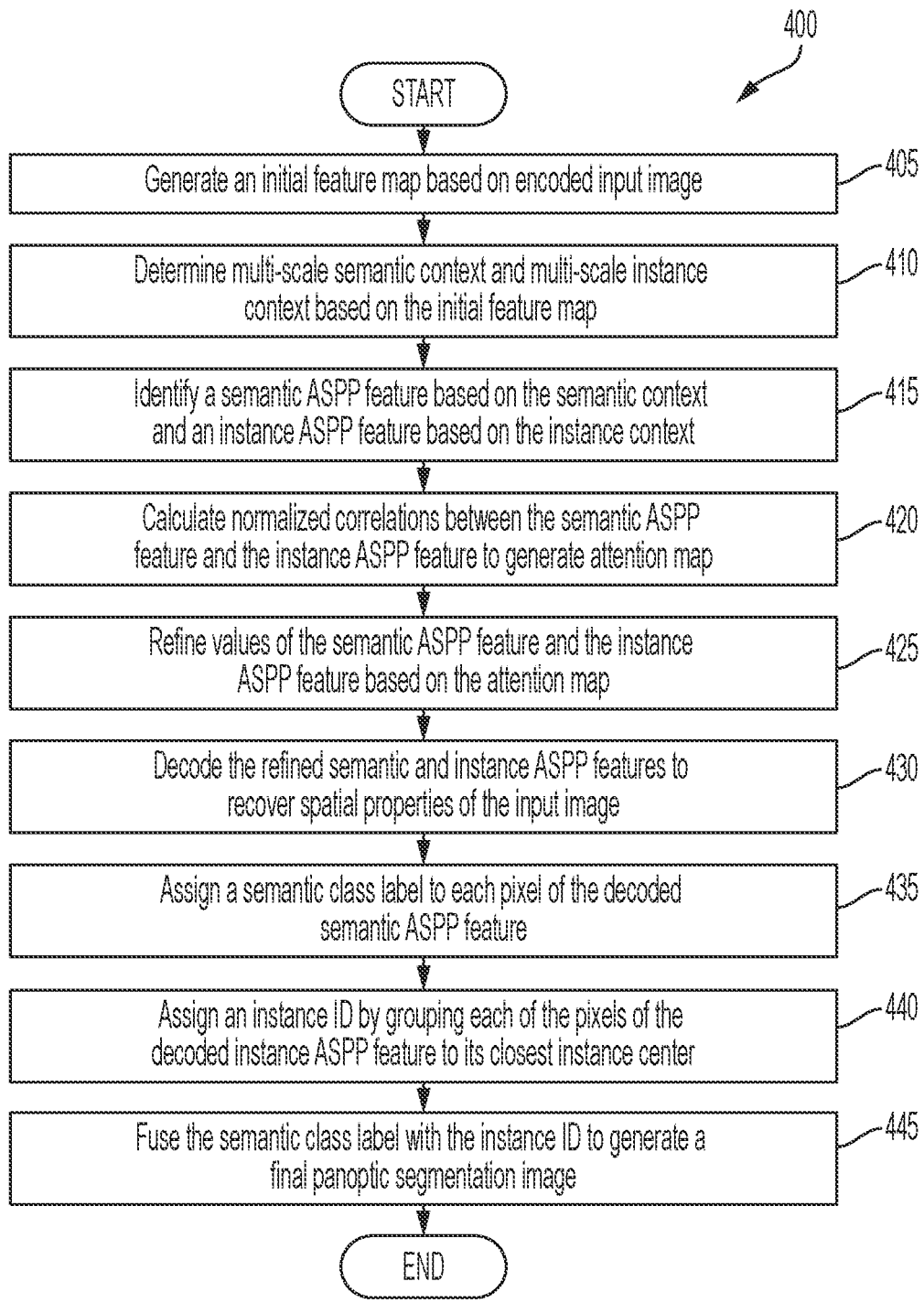
FIG. 4 is a flow diagram illustrating a panoptic segmentation method according to one or more embodiments of the present disclosure.

FIG. 4 is a flow diagram illustrating a panoptic segmentation method according to one or more embodiments of the present disclosure.

For example, the method 400 may be performed by the panoptic segmentation system 200 shown in FIGS. 2 through 3D. However, the present disclosure is not limited thereto, and the operations shown in the method 400 may be performed by any suitable one of the components and elements or any suitable combination of the components and elements of those of one or more embodiments described above. Further, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations.

Referring to FIG. 4, the method 400 may start, and an initial feature map may be generated based on encoded input image at block 405. For example, in some embodiments, the preprocessor/encoder 202 may receive the input image (or an input 3D point cloud) from a camera, sensor, lidar, or the like (e.g., associated with a self-driving vehicle and/or the like), and may include a neural network (e.g., a pretrained convolutional neural network) including a plurality of filters to encode (e.g., to reduce a spatial resolution of) and to extract line features (e.g., edges, horizontal lines, vertical lines, curved lines, and the like) from the input image to generate the initial feature map.

Multi-scale semantic context and multi-scale instance context may be determined based on the initial feature map at block 410. For example, the initial feature map may be provided to each of the semantic multi-scale context generator 208 and the instance multi-scale context generator 214 to determine the multi-scale semantic context (also referred to hereinafter as the semantic context) and the multi-scale instance context (also referred to hereinafter as the instance context), respectively, for the pixels corresponding to the features of the initial feature map. For example, in some embodiments, the semantic multi-scale context generator 208 may determine the semantic context based on the features in the initial feature map using ASPP, and the instance multi-scale context generator 214 may determine the instance context based on the features in the initial feature map using ASPP.

A semantic ASPP feature may be identified based on the semantic context and an instance ASPP feature may be identified based on the instance context at block 415. For example, in some embodiments, the dual value attention processor 204 may extract the semantic ASPP feature based on a convolution (e.g., the 1×1 Conv 302) of the semantic context determined by the semantic multi-scale context generator 208, and may extract the instance ASPP feature based on a convolution (e.g., the 1×1 Conv 304) of the instance context determined by the instance multi-scale context generator 214.

Normalized correlations between the semantic ASPP feature and the instance ASPP feature may be calculated to generate an attention map at block 420. For example, in some embodiments, the dual value attention processor 204 may generate the attention map A based on the semantic ASPP feature $f_s$ and the instance ASPP feature $f_i$ according to Equation 1 above. As an illustrative example, assuming that the instance ASPP feature $f_i$ indicates that a person is an object of interest contained in the input image and the semantic ASPP feature $f_s$ indicates that the person is on the grass, then the grass may provide context information for the person instance. In other words, the grass (e.g., the semantic ASPP feature) and the person (e.g., the instance ASPP feature) may be correlated with each other in the attention map, such that the semantic ASPP feature may be used as the global context of the instance ASPP feature in this illustration.

The values of the semantic ASPP feature and the instance ASPP feature may be refined based on the attention map at block 425. For example, in some embodiments, the semantic value refiner 312 may refine the values of the semantic ASPP feature $f_s$ based on the attention map A according to Equation 2 above, and the instance value refiner 314 may refine the values of the instance ASPP feature $f_i$ based on the attention map A according to Equation 3 above.

The refined semantic ASPP feature and the refined instance ASPP feature may be decoded to recover spatial properties of the input image at block 430. For example, in some embodiments, the semantic decoder 210 may include a single convolution during each upsampling stage to decode the refined semantic ASPP feature based on the original spatial information (e.g., received from the preprocessor/encoder 202), and the instance decoder 216 may include a single convolution during each upsampling stage to decode the refined instance ASPP feature based on the original spatial information.

A semantic class label may be assigned to each pixel of the decoded semantic ASPP feature at block 435, and an instance ID may be assigned by grouping each of the pixels (e.g., each of the "thing" pixels) of the decoded instance ASPP feature to its closest instance center at block 440. For example, in some embodiments, the semantic predictor 212 may predict the class label for each of the pixels of the decoded semantic ASPP feature, the instance center predictor 218 may predict an instance center for each instance (e.g., each object of interest) contained in the decoded instance ASPP feature, and the instance center regressor 220 may predict a center offset of each relevant pixel (e.g., each "thing" pixel) contained in the decoded instance ASPP feature to its predicted instance center. The post-processor 206 may group each of the relevant pixels of the decoded instance ASPP feature to its predicted instance center based on the instance center prediction and the center offset prediction. Note that here, the instance ID for "stuff" pixels may be set to 0.

The semantic class label may be fused with the instance ID to generate a final panoptic segmentation image at block 445, and the method 400 may end. For example, in some embodiments, the pre-processor 206 may determine an instance (e.g., an object of interest) that each of the pixels belong to based on the semantic class label of each of the "thing" pixels and its closest instance center. As an illustrative example, if the semantic class label of a particular "thing" pixel indicates a "thing" label, the pre-processor 206 may determine that the particular pixel belongs to a particular one of the "things" based on the instance ID of the particular pixel (e.g., the particular "thing" pixel's center offset to a predicted center of the particular one of the "things").

Figure 5:
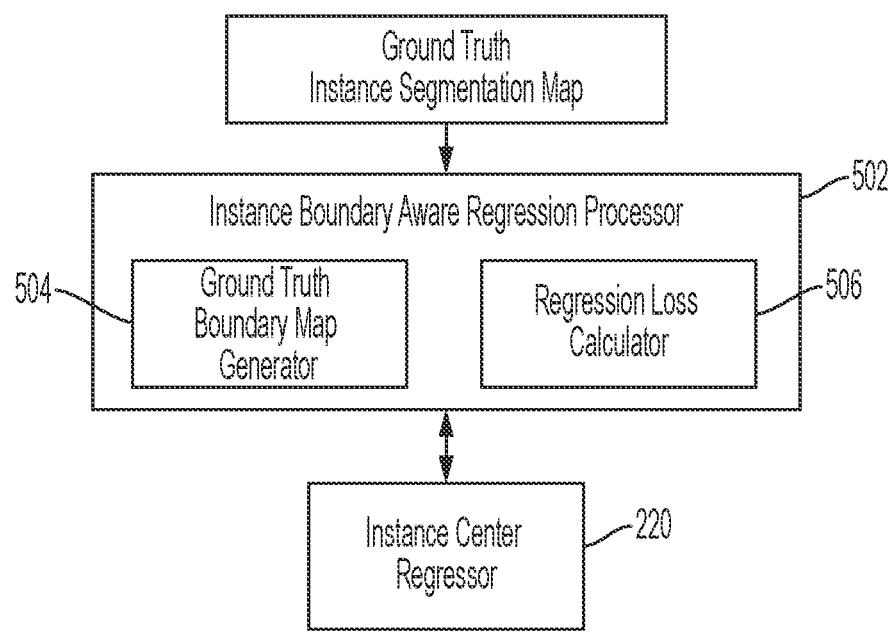
FIG. 5 illustrates a training system of the instance segmentation head of a panoptic segmentation system according to one or more embodiments of the present disclosure.

FIG. 5 illustrates a training system of an instance segmentation head of a panoptic segmentation system according to one or more embodiments of the present disclosure.

Referring to FIG. 5, the training system 500 may include an instance boundary aware regression processor 502 to train the instance center regressor 220 of the instance segmentation head on the importance of boundary pixels when predicting the center offset of each of the relevant pixels (e.g., the "thing" pixels). For example, while the boundary may play an important role in the instance segmentation, it has often been ignored in comparative panoptic segmentation systems. However, when there is some wrong prediction of the center offset for pixels (e.g., the boundary pixels) along (e.g., adjacent to) the boundaries between two "thing" objects, these pixels may be at risk of belonging to the wrong center.

According to one or more embodiments of the present disclosure, the instance center regressor 220 may be trained on the importance of the boundary pixels through a boundary aware regression loss function that penalizes more on wrong center offset predictions for the boundary pixels to their corresponding object (e.g., "thing") centers. For example, according to one or more embodiments, referring to the equation of inference of nearest center, more weights may be applied to these boundary pixels in the boundary aware regression loss function used to train the instance center offset regressor 220. Accordingly, the center offset predictions by the center offset regressor 220 of the instance segmentation prediction head may be improved.

In more detail, as shown in FIG. 5, the instance boundary aware regression processor 502 may include a ground truth boundary map generator 504 and a regression loss calculator 506. As discussed in more detail below with reference to FIG. 6B, the ground truth boundary map generator 504 may generate a ground truth boundary map M based on a ground truth instance segmentation map. The ground truth boundary map M may define the boundary pixels of the ground truth instance segmentation map. For example, for each pixel in the ground truth instance segmentation map, the ground truth boundary map M may define a boundary distance value $m_i$ according to a Euclidean distance of the corresponding pixel to the boundaries. In some embodiments, small error tolerances may be introduced along the boundaries during the training to make the model more robust. For example, the pixels adjacent to (e.g., close to) the boundaries may be checked to ensure that their Euclidian distances to the boundaries are within a threshold. This operation may be similar to (e.g., equivalent to) a morphological dilation operation with a disk kernel. Those pixels that are within the distance threshold have a boundary distance value $m_i$ labeled as a boundary pixel (e.g., labeled as 1), while the others have a boundary distance value $m_i$ labeled as an other pixel (e.g., labeled as 0). In other words, the boundary distance values $m_i$ in the boundary map M for each of the pixels may be defined as $m_i \in \{0,1\}$.

The regression loss calculator 506 may determine a loss between the predicted center offset (e.g., output by the instance center regressor 220) and a ground truth center offset of each of the pixels according to the boundary map M and the boundary aware regression loss function. For example, the regression loss calculator 506 may calculate the boundary aware regression loss function by applying more weights to the boundary pixels defined by the boundary map M, such that the instance center regressor 220 is penalized more for mistaken center offset predictions for the boundary pixels. For example, in some embodiments, the regression loss calculator 506 may calculate the loss L according to Equation 4.

$$L = -\Sigma(w(c_i) + \lambda v(c_i) + \lambda v(c_i) m_i) \|y_i - p_i\|^2 \quad \text{Equation 4:}$$

In Equation 4, $m_i$ is the boundary distance value in the boundary map M for a corresponding pixel i, such that the boundary distance value $m_i$ for the corresponding pixel i may be 1 when identified as a boundary pixel, and 0 otherwise. In addition, $p_i$ is the offset prediction for the corresponding pixel i received from the instance center regressor 220 and is defined as $p_i \in R^c$, and $y_i$ is the ground truth offset of the corresponding pixel i and is defined as $y_i \in R^c$, where c=2. Further, $w(c_i)$ is the weight of the corresponding pixel i, where $c_i$ is the class label that the corresponding pixel i belongs to, $\lambda$ controls the degrees of penalties of wrong predictions along the boundaries, and $v(c_i)$ is the weights for the boundary pixel. Note that the index i can be summed over all the pixels, and may be a natural number.

Accordingly, as shown in Equation 4, if the boundary distance value $m_i$ is 1, indicating that the corresponding pixel i is a boundary pixel, then the degrees of penalties $\lambda$ and weights $v(c_i)$ apply, whereas if the boundary distance value $m_i$ is 0, indicating that the corresponding pixel i is not a boundary pixel, then the degrees of penalties $\lambda$ and weights $v(c_i)$ are zeroed out. Further, the weights $v(c_i)$ may have various choices, for example, the weights $v(c_i)$ may be 0.0 for the boundary pixels in an unlabeled region, and may be 1.0 for all other boundary pixels. Further, the weights $v(c_i)$ may be the same or substantially the same as the weight $w(c_i)$ to consider the imbalance of classes. Moreover, the weights $v(c_i)$ may also be the inverse of the lengths of the boundaries for the class $c_i$ which the corresponding pixel i belongs to, which can be used to address the imbalance of boundary pixels.

Accordingly, during training, the regression loss calculator 506 may improve the center offset predictions output by instance center regressor 220, especially the center offset predictions of the boundary pixels, by reducing (e.g., by minimizing) the loss L based on the boundary aware regression loss function.

Figure 6A:
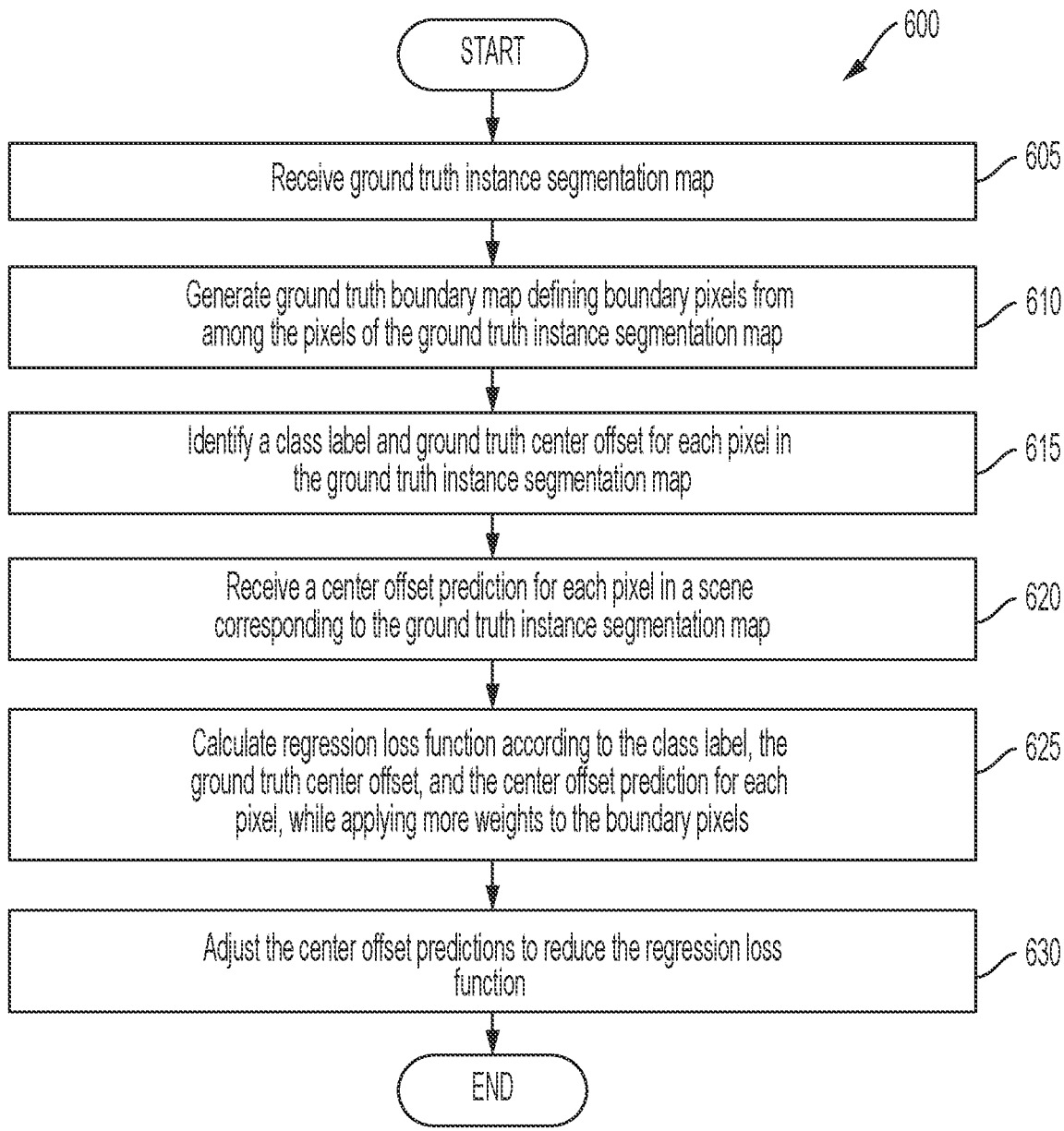
FIG. 6A is a flow diagram illustrating a method of training an instance segmentation head of a panoptic segmentation system according to one or more embodiments of the present disclosure.
Figure 6B:
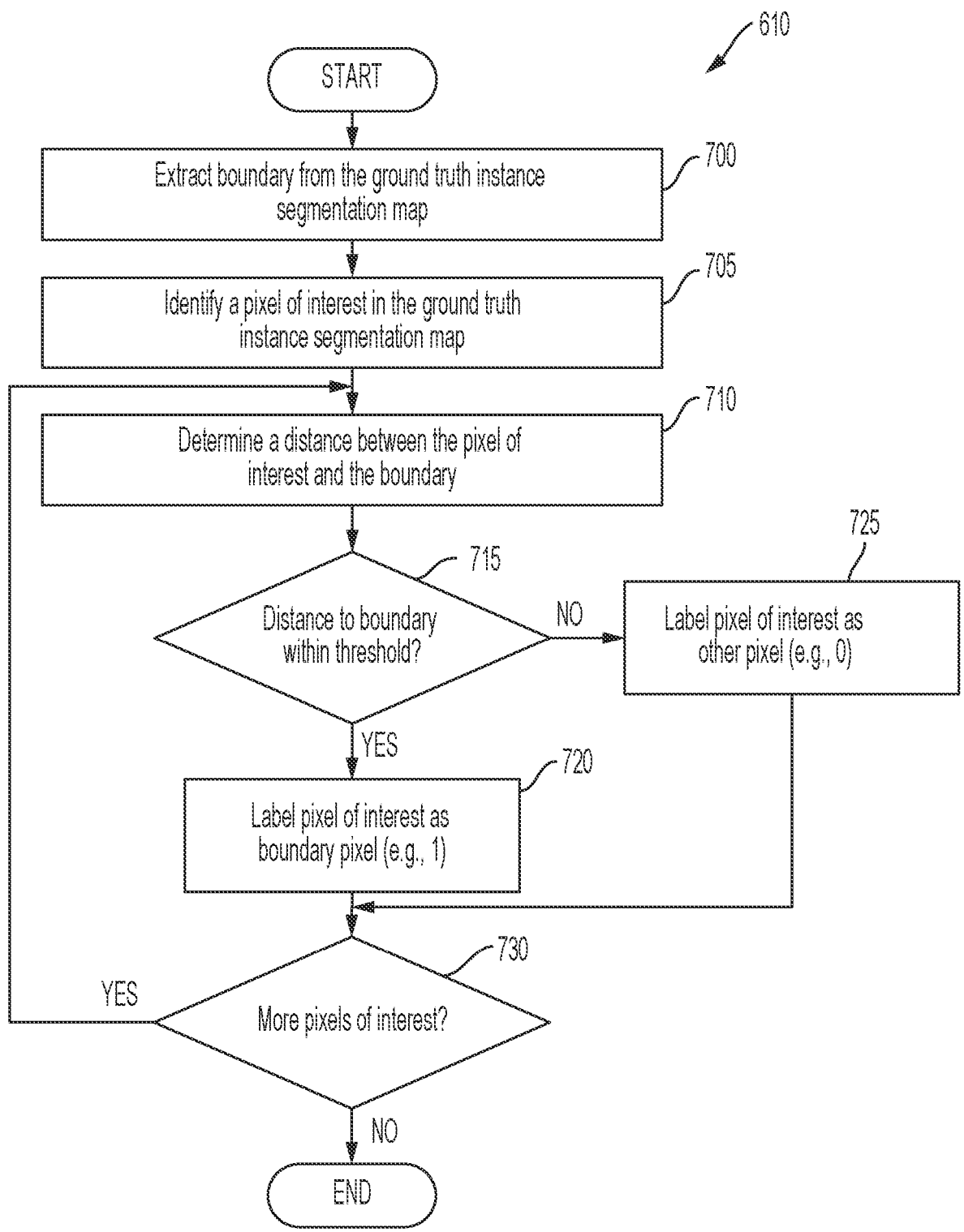
FIG. 6B is a flow diagram illustrating a method of generating a ground truth boundary map according to one or more embodiments of the present disclosure.

FIG. 6A is a flow diagram illustrating a method of training an instance segmentation head of a panoptic segmentation system according to one or more embodiments of the present disclosure. FIG. 6B is a flow diagram illustrating a method of generating a ground truth boundary map according to one or more embodiments of the present disclosure.

The methods 600 and 610 shown in FIG. 6A and FIG. 6B may be performed by the instance boundary aware regression processor 502 shown in FIG. 5. However, the present disclosure is not limited thereto, and the operations shown in the methods 600 and 610 may be performed by any suitable one of the components and elements or any suitable combination of the components and elements of those of one or more embodiments described above. Further, the present disclosure is not limited to the sequence or number of the operations of the methods 600 and 610 shown in FIGS. 6A and 6B, and can be altered into any desired sequence or number of operations as recognized by a person having ordinary skill in the art. For example, in some embodiments, the order may vary, or the methods 600 and 610 may include fewer or additional operations.

First, referring to FIG. 5 and FIG. 6A, the method 600 may start, and a ground truth instance segmentation map may be received at block 605. For example, the ground truth instance segmentation map may include a class label for each pixel contained in a scene (e.g., an input image/point cloud), a boundary around each object of interest contained in the scene, a ground truth instance center of each object of interest, and a ground truth instance center offset for each pixel of each object of interest. In other words, the ground truth instance segmentation map may include the segmentation and instance information for each of the "thing" classes.

A ground truth boundary map defining boundary pixels from among the pixels of the ground truth instance segmentation map may be generated at block 610. For example, as discussed in more detail below with reference to FIG. 6B, the ground truth boundary map generator 504 may generate the ground truth boundary map to define the boundary pixels of the ground truth instance segmentation map by calculating the boundary distance value (e.g., $m_i$) for each of the pixels (e.g., for each corresponding pixel i) in the ground truth instance segmentation map.

A class label and a ground truth center offset for each pixel in the ground truth instance segmentation map may be identified at block 615. For example, for each corresponding pixel i, the regression loss calculator 506 may determine the corresponding class label and the corresponding ground truth center offset, for example, from the semantic segmentation branch and the ground truth instance segmentation map.

A center offset prediction for each pixel in a scene corresponding to the ground truth instance segmentation map may be received at block 620. For example, in some embodiments, the instance center regressor 220 may predict the center offset for each of the pixels in the scene contained by the input image/point cloud, which corresponds to the scene contained in the ground truth instance segmentation map, as described above.

A regression loss function may be calculated according to the class label, the ground truth center offset, and the center offset prediction for each pixel, while applying more weights to the boundary pixels at block 625. For example, in some embodiments, the regression loss calculator 506 may calculate the regression loss function according to Equation 4 above. As discussed above with reference to Equation 4, more weights $v(c_i)$ and degrees of penalties for wrong predictions may be applied to corresponding pixels i identified as boundary pixels (e.g., those having boundary distance values $m_i$ of 1) than other pixels (e.g., those having boundary distance values $m_i$ of 0), such that the instance center regressor 220 may be penalized more for wrong instance center offset predictions for the boundary pixels.

The center offset predictions may be adjusted to reduce the regression loss function at block 630, and the method 600 may end. For example, in some embodiments, during the training, the instance center regressor 220 may adjust the center offset predictions based on the regression loss function calculated by the regression loss calculator 506 in order to reduce (e.g., to minimize) the loss calculated by the regression loss calculator 506. Accordingly, the instance center regressor 220 may be trained to improve the instance center offset predictions of the pixels by emphasizing the importance of the boundary pixels in the regression loss function.

Referring to FIG. 5 and FIG. 6B, in some embodiments, to generate the ground truth boundary map at block 610 of the method 600 of FIG. 6A, a boundary may be extracted from the ground truth instance segmentation map at block 700, and a pixel of interest may be identified from the ground truth instance segmentation map at block 705. For example, in some embodiments, the ground truth boundary map generator 504 may extract a boundary bounding an object of interest, and to introduce small error tolerance along the boundary, the pixel of interest may be identified as a pixel that is close to (e.g., adjacent to) the boundary.

A distance between the pixel of interest and the boundary may be determined at block 710, and the distance may be compared with a threshold at block 715. For example, in some embodiments, the ground truth boundary map generator 504 may calculate a Euclidean distance of the pixel of interest to the boundary, and the Euclidean distance to the boundary may be compared with a threshold. If the distance to the boundary is within (e.g., less than or equal to) the threshold (e.g., YES at block 715), the pixel of interest may be labeled as a boundary pixel at block 720. For example, in some embodiments, the ground truth boundary map generator 504 may set the boundary distance value $m_i$ of the pixel of interest to 1. On the other hand, if the distance to the boundary pixel is not within (e.g., greater than) the threshold (e.g., NO at block 715), the pixel of interest may be labeled as an other pixel at block 725. For example, in some embodiments, the ground truth boundary map generator 504 may set the boundary distance value $m_i$ of the pixel of interest to 0.

A determination may be made whether or not there are more pixels of interest to consider at block 730. If there are more pixels of interest to consider (e.g., YES at block 730), then the method 610 may continue at block 710 to determine the distance between the pixel of interest and the boundary as described above. On the other hand, if there are no more pixels of interest to consider (e.g., NO at block 730), then the method 610 may end, such that the method 600 of FIG. 6A may continue at block 615 and the boundary distance value $m_i$ of each pixel defined by the resulting ground truth boundary map may be used to calculate the regression loss function, for example, according to Equation 4 discussed above.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A computer vision system comprising:
one or more processors; and
memory comprising instructions that, when executed by the one or more processors, cause the one or more processors to:
 determine a semantic multi-scale context feature and an instance multi-scale context feature of an input scene;
 generate a joint attention map based on the semantic multi-scale context feature and the instance multi-scale context feature;
 refine the semantic multi-scale context feature and instance multi-scale context feature based on the joint attention map; and
 generate a panoptic segmentation image based on the refined semantic multi-scale context feature and the refined instance multi-scale context feature.

2. The computer vision system of claim 1, wherein to generate the joint attention map, the instructions further cause the one or more processors to calculate normalized correlations between the semantic multi-scale context feature and the instance multi-scale context feature.

3. The computer vision system of claim 2, wherein to calculate the normalized correlations, the instructions further cause the one or more processors to:
convolve and reshape the semantic multi-scale context feature;
convolve, reshape, and transpose the instance multi-scale context feature;
apply a matrix multiplication operation between the reshaped semantic multi-scale context feature and the transposed instance multi-scale context feature; and
apply a softmax function to the output of the matrix multiplication operation.

4. The computer vision system of claim 1, wherein to refine the semantic multi-scale context feature, the instructions further cause the one or more processors to:
convolve and reshape the semantic multi-scale context feature;
apply a matrix multiplication operation between the reshaped semantic multi-scale context feature and the joint attention map; and
reshape the output of the matrix multiplication operation.

5. The computer vision system of claim 1, wherein to refine the instance multi-scale context feature, the instructions further cause the one or more processors to:
- convolve and reshape the instance multi-scale context feature;
- apply a matrix multiplication operation between the reshaped instance multi-scale context feature and the joint attention map; and
- reshape the output of the matrix multiplication operation.

6. The computer vision system of claim 1, wherein to generate the panoptic segmentation image, the instructions further cause the one or more processors to:
- generate a semantic segmentation prediction based on the refined semantic multi-scale context feature;
- generate an instance segmentation prediction based on the refined instance multi-scale context feature; and
- fuse the semantic segmentation prediction with the instance segmentation prediction.

7. The computer vision system of claim 6, wherein the instance segmentation prediction comprises:
- an instance center prediction; and
- an instance center offset prediction.

8. The computer vision system of claim 7, wherein the instance center offset prediction is trained accordingly to an instance boundary aware regression loss function that applies more weights and penalties to boundary pixels defined in a ground truth boundary map than those applied to other pixels.

9. The computer vision system of claim 8, wherein the ground truth boundary map is generated by comparing a Euclidean distance between a pixel and a boundary with a threshold distance.

10. A panoptic segmentation method, comprising:
- determining a semantic multi-scale context feature and an instance multi-scale context feature of an input scene;
- generating a joint attention map based on the semantic multi-scale context feature and the instance multi-scale context feature;
- refining the semantic multi-scale context feature and instance multi-scale context feature based on the joint attention map; and
- generating a panoptic segmentation image based on the refined semantic multi-scale context feature and the refined instance multi-scale context feature.

11. The method of claim 10, wherein the generating of the joint attention map comprises calculating normalized correlations between the semantic multi-scale context feature and the instance multi-scale context feature.

12. The method of claim 11, wherein the calculating of the normalized correlations comprises:
- convolving and reshaping the semantic multi-scale context feature;
- convolving, reshaping, and transposing the instance multi-scale context feature;
- applying a matrix multiplication operation between the reshaped semantic multi-scale context feature and the transposed instance multi-scale context feature; and
- applying a softmax function to the output of the matrix multiplication operation.

13. The method of claim 10, wherein the refining of the semantic multi-scale context feature comprises:
- convolving and reshaping the semantic multi-scale context feature;
- applying a matrix multiplication operation between the reshaped semantic multi-scale context feature and the joint attention map; and
- reshaping the output of the matrix multiplication operation.

14. The method of claim 10, wherein the refining of the instance multi-scale context feature comprises:
- convolving and reshaping the instance multi-scale context feature;
- applying a matrix multiplication operation between the reshaped instance multi-scale context feature and the joint attention map; and
- reshaping the output of the matrix multiplication operation.

15. The method of claim 10, wherein the generating of the panoptic segmentation image comprises:
- generating a semantic segmentation prediction based on the refined semantic multi-scale context feature;
- generating an instance segmentation prediction based on the refined instance multi-scale context feature; and
- fusing the semantic segmentation prediction with the instance segmentation prediction.

16. The method of claim 15, wherein the instance segmentation prediction comprises:
- an instance center prediction; and
- an instance center offset prediction.

17. The method of claim 16, wherein the instance center offset prediction is trained accordingly to an instance boundary aware regression loss function that applies more weights and penalties to boundary pixels defined in a ground truth boundary map than those applied to other pixels.

18. The method of claim 17, wherein the ground truth boundary map is generated by comparing a Euclidean distance between a pixel and a boundary with a threshold distance.

19. A panoptic segmentation system comprising:
- one or more processors; and
- memory comprising instructions that, when executed by the one or more processors, cause the one or more processors to:
  - extract a semantic multi-scale context feature of an input scene;
  - extract an instance multi-scale context feature of the input scene;
  - generate a joint attention map based on the semantic multi-scale context feature and the instance multi-scale context feature;
  - refine the semantic multi-scale context feature based on the joint attention map;
  - refine the instance multi-scale context feature based on the joint attention map;
  - predict a semantic class label based on the refined semantic multi-scale context feature;
  - predict an instance center and an instance center offset based on the refined instance multi-scale context feature; and
  - generate a panoptic segmentation image based on the semantic class label, the instance center, and the instance center offset.

20. The panoptic segmentation system of claim 19, wherein the predicting of the instance center and the instance center offset is based on an instance boundary aware regression loss function that applies more weights and penalties to boundary pixels defined in a ground truth boundary map than those applied to other pixels, and
wherein the ground truth boundary map is generated by comparing a Euclidean distance between a pixel and a boundary with a threshold distance.

* * * * *